United States Patent [19]

Reese

[11] Patent Number: 4,687,501
[45] Date of Patent: Aug. 18, 1987

[54] LIGHTWEIGHT BENDING IRON HEAT SHIELDS FOR GLASS BENDING MOLDS

[75] Inventor: Thomas J. Reese, Sarver, Pa.

[73] Assignee: PPG Industries, Inc., Pittsburgh, Pa.

[21] Appl. No.: 854,240

[22] Filed: Apr. 21, 1986

[51] Int. Cl.⁴ ............................................ C03B 23/025
[52] U.S. Cl. ...................................... 65/103; 65/104; 65/107; 65/288; 65/350
[58] Field of Search .............. 65/103, 104, 107, 182.2, 65/287, 288, 350

[56] References Cited

U.S. PATENT DOCUMENTS

| | | |
|---|---|---|
| 3,086,376 | 4/1963 | Carson et al. |
| 3,086,377 | 4/1963 | Leflet |
| 3,137,558 | 6/1964 | Oberstar |
| 3,186,821 | 6/1965 | Carson et al. |
| 3,253,898 | 5/1966 | Leflet |
| 3,264,082 | 8/1966 | Golightly |
| 3,265,488 | 8/1966 | Ross et al. |
| 3,269,822 | 8/1966 | Carson et al. |
| 3,281,231 | 10/1966 | McKelvey et al. |
| 3,307,930 | 3/1967 | Stevens ................................ 65/103 |
| 3,433,616 | 3/1969 | Wampler et al. |

FOREIGN PATENT DOCUMENTS 653291 12/1962 Canada ................................. 65/288

Primary Examiner—Arthur Kellogg
Attorney, Agent, or Firm—Andrew C. Siminerio

[57] ABSTRACT

Shields tend to retain heat while shading glass sheets from a heat source. As the shield retains more heat, it loses its effectiveness to shade the glass sheet. A second shield is positioned between the glass sheet and the hot shield to maintain effective shading of the glass sheet for proper heat distribution and forming of the sheet.

20 Claims, 3 Drawing Figures

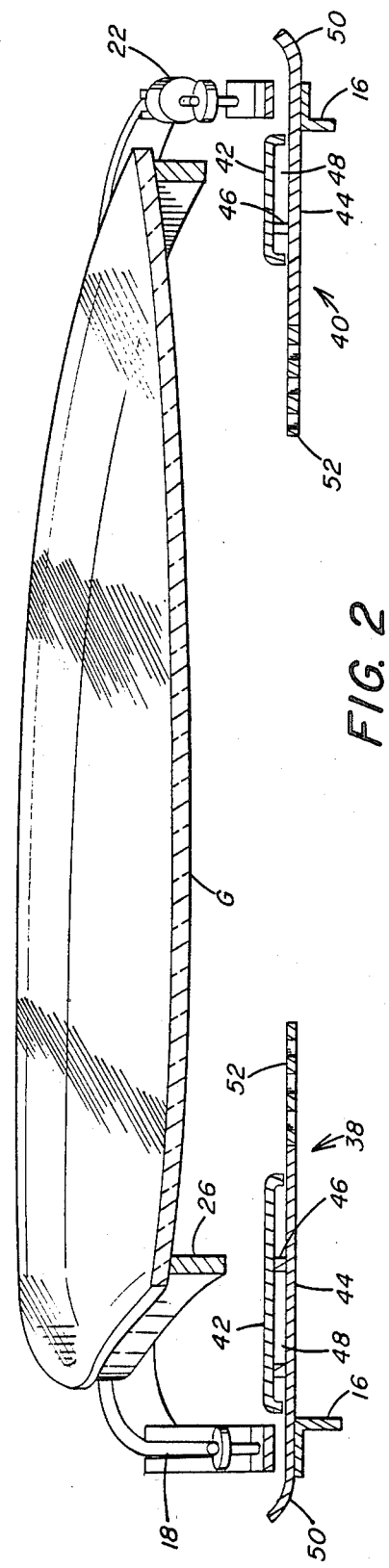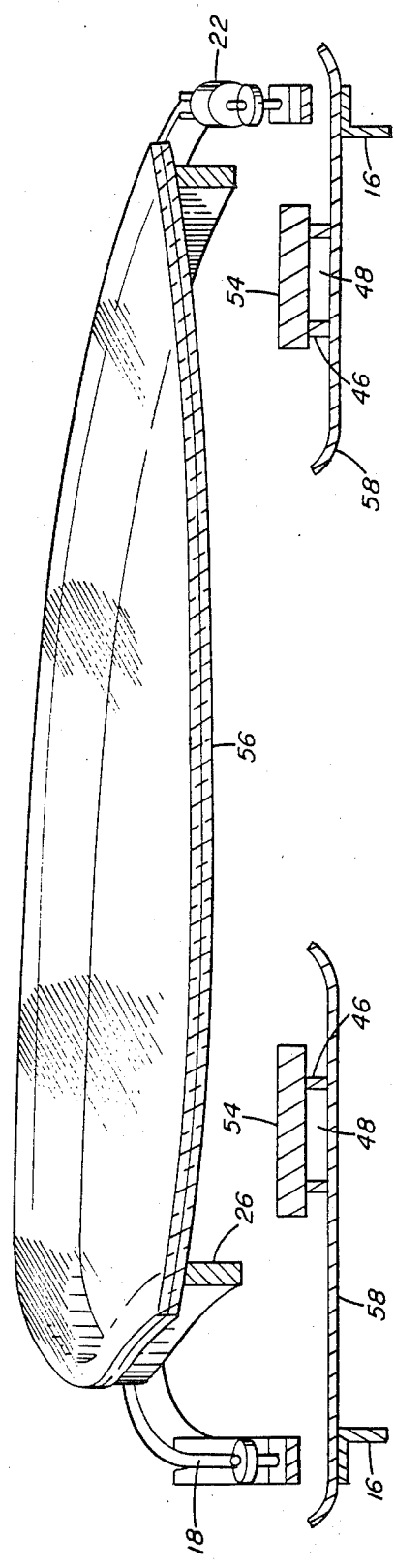

LIGHTWEIGHT BENDING IRON HEAT SHIELDS FOR GLASS BENDING MOLDS

BACKGROUND OF THE INVENTION

1. Field of the Invention

This invention relates to the shaping of glass sheets and, in particular, to lightweight bending iron shields for forming hot glass sheets to complicated shapes.

2a. Technical Considerations

In the heating and shaping of glass sheets it is common practice to use contoured bending molds that support a flat glass sheet and convey it through a heating lehr. As the temperature of the glass increases and approaches its heat softening temperature, it begins to sag under the force of gravity and conforms to the contours of the mold. If required, the bending molds can include hinged end sections to help facilitate bending portions of the glass sheet to sharp curvatures that could not normally be obtained through normal sag bending techniques. Where windshield glass is being bent, two glass sheets, or doublets, can be conveyed through the lehr on the bending mold and shaped simultaneously.

The trend in automotive styling has been toward the use of glass closures that conform with the shape of the vehicle, requiring more complicated shapes, which in turn require additional bending techniques. These configurations include compound bends such as deep sags or S-shaped curves, wherein the curvature is continuous but changes from one portion of the glass sheet to another.

To effect these configurations, localized heat distribution patterns are established at the bending mold so as to direct more heat to the areas requiring additional sag or small radius bends. In a sag bending operation where the heat source is located above the glass sheet to be shaped, heat absorbers or ballast are used to establish a temperature variation between different portions of the glass sheet to produce the desired curvature. The ballast is placed below the glass sheet at areas that are to remain relatively flat or do not require the small radius bends. The ballast is usually in the form of solid steel plates or heat absorbing metal mesh. The ballast absorbs heat that would otherwise be absorbed by the glass sheet and cause the sheet to sag more than desired. Ballast is generally ¼" to ½" thick or more and can be stacked to increase its effective heat absorbing capacity.

In order to more uniformly heat the top and bottom surfaces of the glass sheet to be shaped, bottom heat can be added below the glass sheet. This is particularly important in instances of simultaneously sag bending glass doublets where the heating must be controlled so that final curved configuration of each glass sheet complements the other. When bottom heat is added, the amount of top heat is generally reduced to balance the total amount of heat required to sag bend the glass sheets to the desired configuration. When lehr heat is supplied from below the glass sheet, shields are used to shade the lower sag areas from the heat source to establish the required temperature differential and retard heat absorption and limit the sag.

It has been found that as the bending molds progress through the heating lehr, thin ballast and/or shields may absorb sufficient heat to begin to reradiate the absorbed heat. As a result the ballast loses its effectiveness as a heat sink and the shields lose their effectiveness as a shade for the glass sheet. When this occurs, heat is directed to areas of low sag due to the ineffective ballast and/or shields, thus disturbing the heat distribution of the bending mold and resulting in glass sheets shaped to the wrong configuration.

It would be advantageous to provide a bending mold wherein the shields can operate to shade selected portions of the glass sheet without loosing their effectiveness as a shield.

2b. Patents of Interest

U.S. Pat. No. 3,020,677 to White teaches the use of water boxes mounted below the glass sheet in a bending mold to generate steam to keep the center of the windshield cool. Heat is provided from both above and below the bending mold as the glass is conveyed through the lehr.

The following list of patents discloses the use of shields and heat absorbers for bending glass sheets:

| U.S. Pat. No. | Inventor |
| --- | --- |
| 3,086,376 | Carson et al. |
| 3,086,377 | Laflet Jr. |
| 3,137,558 | Oberstar |
| 3,186,821 | Carson et al. |
| 3,253,898 | Laflet Jr. |
| 3,264,082 | Golightly |
| 3,265,488 | Ross et al. |
| 3,269,822 | Carson et al. |
| 3,281,231 | McKelvey et al. |
| 3,433,616 | Wampler et al. |

In each of these patents, wire mesh screens or steel plates are used as heat absorbers to draw heat away from selected portions of an overlying glass sheet. As a result, the glass sheets in the regions of the heat absorbers do not reach the heat softening temperature at the same time the remainder of the glass sheet attains this temperature so that there is less sag in these selected areas. In particular, U.S. Pat. No. 3,186,821 uses plates to act as both shields and heat absorbers to form the glass sheets, i.e., to both shade the glass and to further withdraw heat from the atmosphere adjacent the shaded portions of the sheet to further retard the heating of the shaded portions.

SUMMARY OF THE INVENTION

An object of this invention is to provide a bending mold with lightweight heat shielding members that maintain their shading effectiveness throughout the bending operation so as to sustain a proper bending heat pattern. The bending mold includes a support frame and a glass sheet shaping rail supported on the frame. A supporting surface of the rail conforms in elevation and outline to the desired shape of the glass sheet to be shaped slightly inboard of the glass sheet's perimeter. A first shield member is positioned in facing relationship between selected portions of the glass sheet and a heat source to shade the selected portions from the heat source. An additional shield member is positioned between the selected portions of the glass sheet and the first shield member to shade the selected portions of the glass sheet as the first shield member loses its shading effectiveness. In one embodiment of the invention, the shields are constructed to lightweight heat resistant plates, such as 1/16" thick steel. The first shield member can be extended beyond the selected portions of the glass sheet to shade these portions from angled heat radiation as well as vertical heat radiation.

The shields of the present invention keep selected parts of a glass sheet cooler than other parts to shape the sheet, but with less metal passing through the lehr than with heavy ballast. In the case of heavy ballast, heat is carried out of the lehr by the ballast and is radiated into the room air as it recycles from the exit end of the lehr back to the loading end. Another object of this invention is to reduce the amount of this heat loss so that less total heat is used in the bending operation.

BRIEF DESCRIPTION OF THE DRAWINGS

FIG. 2 is a cross-section of the bending mold through lines 2—2 of FIG. 1 with portions removed for clarity showing the shields of the present invention.

FIG. 3 is a cross section of a bending mold similar to that shown in FIG. 2 showing a heavy ballast heat absorber and a shield.

DETAILED DESCRIPTION OF THE INVENTION

Figure 1:
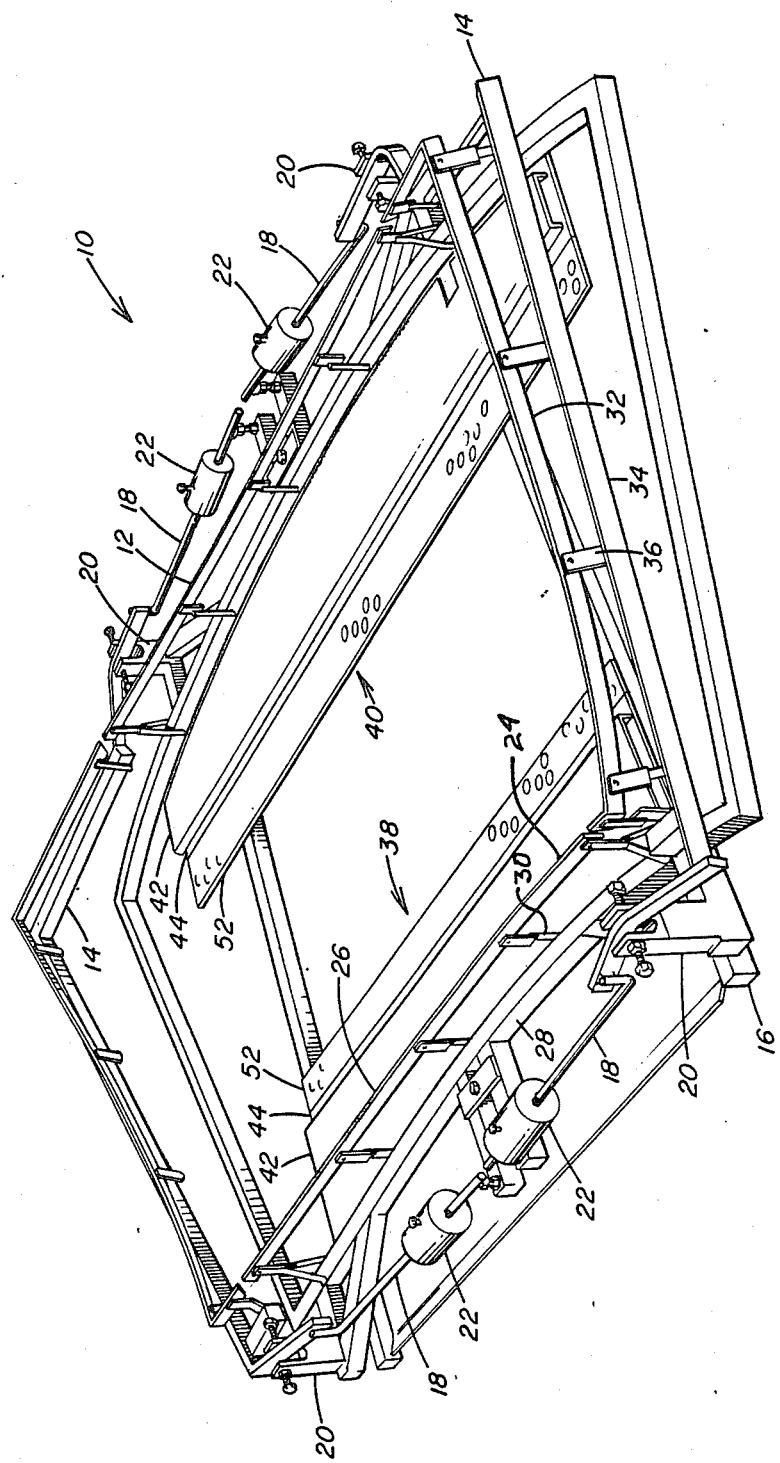
FIG. 1 is an isometric view of a bending mold incorporating the present invention.

FIG. 1 shows a glass bending mold 10 incorporating the present invention. The mold 10 is an articulating mold similar to that disclosed in U.S. Pat. No. 3,976,462 to Satara, but non-articulating molds similar to U.S. Pat. No. 4,375,978 to Reese et al. can also be used with the present invention. Although not limiting to the present invention, the mold 10 comprises a central mold portion 12 flanked by two pivoting mold end sections 14. The mold 10 is supported for movement through a heating lehr (not shown) by a main frame 16. Weight arms 18 are attached to each mold end section 14 and are mounted on frame 16 by hinge post 20. Arms 18 are provided with counterweights 22 at their longitudinal inward extremities which tend to rotate the mold end sections 14 about hinge posts 20 from an open position to a closed position as depicted in FIG. 1. Weight arms 18 are positioned laterally outside shaping rails 24 of the bending mold 10.

The shaping rail 24 of the mold 10 includes a shaping rail 26 supported from rigid reinforcing bar 28 by members 30 in the central mold portion 12 and a shaping rail 32 supported from reinforcing bar 34 by members 36 in each mold end section 14. Reinforcing bar 28 in the central mold section 12 is rigidly attached to carrying frame 16 while reinforcing bar 34 in each mold end section 14 is pivotally mounted on frame 16 through the hinge post 20. When the mold end sections 14 are in their pivoted, upright and closed position as shown in FIG. 1, the elevational contour of the shaping rail 24 defines the final desired contours of the shaped glass sheet slightly inboard of the glass sheet perimeter.

As shown in FIGS. 1 and 2 of the present invention, shields 38 and 40 are disposed in facing relationship to a glass sheet G (shown in FIG. 2 only) and positioned between the glass sheet and a lower heat source to selectively shade portions of the glass sheet from heat radiated by the heat source. It is understood that a heat source could be positioned above the glass sheet and that shields as disclosed in the present invention can be positioned above the glass sheet between the heat source and glass sheet. By shielding the selected glass portions from the heat, these portions do not reach a heat softening temperature until after the unshielded portions have reached the softening temperature so that the shielded portions have less time to sag under the force of gravity. Specifically, as shown in FIG. 1, the opposing longitudinal edges are shaded. This type of shielding arrangement would be appropriate where the glass sheet to be shaped requires a relatively flat curvature along its opposing longitudinal edges and a greater curvature along its center line. It should be appreciated that the shields can be placed anywhere that shading is required and that the shield positions in FIG. 1 are for illustration only.

Referring to FIG. 2, shields 38 and 40 include an upper steel plate 42 supported above a lower steel plate 44 in any convenient manner such as a spacer member 46, with an air space 48 therebetween. The air space 48 provides an insulating layer between plates 42 and 44, This insulation improves the effectiveness of the shield as described below. Although not limited in the present invention, plates 42 and 44 are constructed of any lightweight durable, heat resistant material. In the practice of this invention, 1/16" thick steel shields spaced at approximately ½" or more have been successfully used to shape glass sheets.

As lower shield plate 44 shades selected portions of the glass sheet from a lower heat source during heating of the glass sheet in the lehr, it absorbs heat. As the sag bending operation progresses and the bending mold 10 moves through the lehr (not shown), the plate 44 continues to absorb heat until it becomes a secondary heat emitter, i.e., it will radiate heat toward the glass sheet rather than shade it. As a result, plate 44 gradually loses its effectiveness as a shield and the heat that was previously shaded by the plate 44 disrupts the heat pattern required to sag the glass sheets to the desired curvature. To reduce this loss of effectiveness, the upper plate 42 acts as a shield to the glass sheet with air space 48 providing an additional insulating layer between plates 42 and 44 by requiring any heat transferred from the latter to the former to be transferred through the air in the air space 48. The thermal conductivity of air is low as compared to the metal plates so that only a small amount of the heat will be transferred. The plate 42 will continue to shade the glass sheet from the lower heat source so that the heat pattern can be maintained and the desired sag in the glass sheet can be achieved.

It should be noted that if the amount of heat and time required to shape the glass sheet G is such that upper plate 42 as well as lower plate 44 begins to lose its shading effectiveness, an additional shield plate (not shown) can be added between plate 42 and glass sheet G to maintain effective shading.

Although not limiting in the present invention, shields 38 and 40 may be extended beyond that portion of the glass sheet that would normally overlie conventional heavy ballast heat absorbers. This is done to shade the glass sheet from angled or diagonal radiation from bottom heat sources as well as from vertical radiation, i.e., when the sheet is directly over a heat source. To prevent angled radiation on the leading and trailing edges of the glass sheet, the shields can be extended beyond the peripheral edge of the sheet. In addition, the end portion 50 of lower plate 48 can be curved to further shade the glass sheet G.

If desired, a transition-type shield 52 can be used between the areas of shielded and unshielded glass to provide a more gradual change in the heat pattern and avoid abrupt changes in the sag contour and corresponding changes in optical distortion. Although not limited by the present invention, as shown in FIGS. 1 and 2 a lightweight perforated plate forms the boundary between the shaded and unshaded areas of the glass sheet to provide a gradient in the pattern of the heat selectively shaded from the overlying glass sheet. The transition shield 52 provides some shading but does not provide as much shading action as the shields 38 and 40. In addition, it will absorb sufficient heat to become a secondary heat emitter. Both of these conditions cause the transition shield 52 to be a less effective shade than the solid shields. As a result, the transition shield 52 minimizes thermal shock between adjacent areas of the glass sheet subjected to selective heat shielding and free from heat shielding. It should be appreciated that although FIGS. 1 and 2 show the transition shield 52 as being a separate member attached to the lower plate 44 of the shield 38 and 40, the transition shield 52 may also be merely an extention of the lower plate 44.

With continued reference to FIGS. 1 and 2, as an alternative, the upper plate 42 can be made smaller in area than underlying lower plate 44. With this configuration, portions of lower plate 44 will not be covered so that after lower plate 44 heats up, the uncovered areas will gradually loose their shading effectiveness thus providing a gradual change in effective shading of the glass sheet from the shaded to the unshaded areas.

The use of lightweight shields as taught in the present invention provides several advantages over the use of heavy ballast heat absorbers. To provide the proper heat distribution pattern, heavyweight ballasts must absorb heat. Ballast is generally of sufficient size and mass to act as a heat sink during the bending operation so that the absorbed heat is not reradiated during bending. As a result, more heat must be put into the system and the heat absorbed by the ballast is lost to the surrounding air as the bending mold and ballast cool down during its cycling back to the loading end of the lehr. In addition, the ballast begins to reradiate its absorbed heat after the shaped glass sheet and mold leave the heating lehr and enter the cooling zone (not shown) of the shaping process. During the cooling operation, both the shaped glass sheet and ballast radiate heat, but due to the mass and composition of the ballast, the balast radiates more heat for a longer period of time. As a result the glass sheets which are positioned above the ballast will take longer to cool to the proper temperature for subsequent handling and processing. This may require additional power for cooling fans and/or a longer cooling station. In addition, the ballast may establish a thermal gradient in the glass sheet both through the glass sheet thickness and in the plane of the glass sheet. While the glass sheets are in the cooling zone, the ballast cools off by radiating its absorbed heat. As a result the balast tends to maintain a higher temperature at the glass sheet surface facing the ballast than at the opposite glass sheet surface. Furthermore, those portion of the glass sheet spaced further from the ballast will absorb less reradiated heat and thus cool faster than those portions of the glass sheet directly adjacent to the ballast. If the temperature differentials established by the thermal gradients are great enough, the glass sheets may break. When multiple glass sheets are being formed, e.g. doublets, the additional heat in the lower ply may cause additional sagging. The gap between the two plies may act as insulation to further prevent heat from the ballast being absorbed by the upper ply, thus establishing even a greater thermal gradient in the glass sheet.

With the lightweight shielding of the present invention, the sag is controlled by shading the glass rather than absorbing heat that would otherwise be absorbed by the glass so that less total heat and associated power is required. Furthermore less heat is lost through the cooling of the shields since they cannot absorb and retain as much heat as the ballast. As a result, they will cool faster than the ballast and will not radiate as much heat so that they will not adversely affect the cooling operation.

In addition, when ballast is used in bending operations, conveying rates through the lehr are dictated by the thickness and heat absorbing properties of the ballast. At the beginning of the cycle, the glass sheet surface exposed to the upper heat source will absorb heat while the cold ballast prevents the lower surface from absorbing an equivalent amount of heat. As a result a temperature gradient is established through the thickness of the glass sheet and along the plane of the glass sheet. If the temperature differential due to the gradient is too great, the glass sheet may break. Thus conveying speed and associated throughput cannot be increased to a rate faster than that needed by the glass sheet to minimize the differential in the temperature gradient so as to reduce glass breakage.

It should be appreciated the shield design of the present invention can be used in conjunction with heavy ballast heat absorbers when required, e.g., when the desired heating pattern requires both top and bottom heat. For example, in bending a glass doublet where separation of the plies is an important concern, the amount of heat supplied from below the glass sheet may be reduced thus reducing the amount of heat absorbed in the bottom ply from the bottom heat. Although this will minimize ply separation, it will lessen the effects of the shield as the principal means for establishing a temperature gradient across the glass sheet surface since less heat is supplied from below the glass sheet and more heat is supplied from above. As shown in FIG. 3, to effect the desired glass configuration, ballast 54 can be positioned below certain select portions of a glass sheet doublet 56 to absorb heat while a shield 58 spaced below the ballast 54 shades both the ballast 54 and the glass sheet doublet 56. Shield 58 will limit the heat absorbed by the ballast 54 from the bottom heat source so that the ballast 54 can more effectively absorb heat from the upper heat source. If required, an addition upper shield (not shown) can be positioned between the shield 58 and the glass doublet 56 to further shade the glass doublet 56. As a result, the total combined effect provides the required heat pattern for the desired configuration.

The form of the invention described and illustrated herein represents a description of an illustrative preferred embodiment thereof. It is understood that various changes can be made without departing from the gist of the invention defined in the claimed subject matter that follows.

I claim:

1. A bending mold for shaping heat softened glass sheets comprising:

a support frame;

a glass sheet shaping rail supported on said frame with a supporting surface that conforms in elevation and outline to the desired shape of said glass sheet to be shaped slightly inboard of said glass sheet perimeter; and a heat shielding means positioned between said heating means and selected portions of said glass sheet to retard transfer of heat from said heating means to said selected portions of said glass sheet, said heat shielding means including;

a first member positioned in facing relationship between said selected portions of said glass sheet to be shaped and said heating means; and a shield member positioned between said first member and said heating means and spaced from said first member to provide a gaseous space therebetween to retard transfer of heat between said heating means and said first member.

2. The mold as in claim 1 wherein said first member and shield member are lightweight heat resistant plates.

3. The mold as in claim 2 wherein said first member and shield member are 1/16" thick steel plate.

4. The mold as in claim 3 wherein said first member is spaced at least approximately ½" from said shield member.

5. The mold as in claim 4 wherein said gaseous space is an ambient temperature air space.

6. The mold as in claim 2 wherein said shield member is extended beyond said selected portions of said glass sheet to be shaped to retards transfer of heat to said selected portions from angled heat radiation from said heating means.

7. The mold as in claim 6 further including a transition shield member positioned generally adjacent said shield member wherein said transition shield member partially retards transfer of heat from said heating means to selected areas of said glass sheet adjacent said selected portions so as to graduate the transfer of heat from said heating means to said glass sheet between said selected portions and the remaining portions of said glass sheet.

8. The mold as in claim 7 wherein said first member is smaller in area than said shield member.

9. The mold as in claim 8 wherein said gaseous space is an ambient temperature air space.

10. The mold as in claim 2 wherein said gaseous space is an ambient temperature air space.

11. The mold as in claim 10 further including heavy ballast heat absorbers positioned in generally close proximity to other selected portions of said glass sheet to be shaped to absorb heat in the vicinity of said other selected portions.

12. The mold as in claim 10 wherein said first member is smaller in area than said shield member.

13. The mold as in claim 10 wherein said shaping rail includes at least one moveable rail section pivotally connected to a stationary central mold rail section.

14. the mold as in claim 10 further including a transition shield member positioned at generally adjacent said shield member wherein said transition shield member partially retards transfer of heat from said heating means to selected areas of said glass sheet adjacent said selected portions so as to graduate the transfer of heat from said heating means to said glass sheet between said selected portions and the remaining portions of said glass sheet.

15. The mold as in claim 1 wherein said first member is a heavy ballast heat absorber positioned between said selected portions of said glass sheet to be shaped and said heating means and said shield member is a lightweight heat resistant plate.

16. The mold as in claim 15 wherein said gaseous space is an ambient temperature air space.

17. In the method of shaping glass sheets by sag bending, including the steps of positioning a glass sheet to be shaped on a support frame having a shaping rail with a support surface that conforms in elevation and outline to the desired shape of a sheet to be shaped slightly inboard of the sheet perimeter, heating said glass sheet to its deformation temperature so that said glass sheet sags in contact with said shaping rail, retarding the transfer of heat from a heat source to selected portions of said glass sheet by positioning plate members between said selected portions and said heat source so as to delay said selected portions from reaching its heat deformation temperature, wherein said plate members absorb heat from said heat source and re-radiant said heat so as to lessen the effectiveness of said plate members in limiting heat transfer between said heat source and said selected portions the improvement comprising:

providing shield members between selected ones of said plate members and said heat source with a gaseous space between said plate members and said shield members so as to retard transfer of heat between said plate members and shield members and maintain the effectiveness of said plate members in retarding heat transfer from said heat source to said selected portions of said glass sheet.

18. The method as in claim 17 further including the step of extending said shield members beyond said selected portions to retard transfer of heat to said selected portions of said glass sheet from angle heat radiated from said heat source.

19. The method as in claim 17 further including the steps of providing heat absorbers in close proximity to other selected portions of said glass sheet to absorb heat in the vicinity of said other selected portions.

20. The method as in claim 17 further including the step of partially retarding the transfer of heat from said heat source to a transition area adjacent said selected portions of said glass sheet to graduate the transfer of heat from said heating source to said glass sheet between said selected portions and the remaining portions of said glass sheet.

* * * * *